(12) United States Patent
Bernreuther et al.

(10) Patent No.: US 10,267,313 B2
(45) Date of Patent: Apr. 23, 2019

(54) CENTRIFUGAL PUMP IMPELLER

(71) Applicant: Bühler Motor GmbH, Nürnberg (DE)

(72) Inventors: Georg Bernreuther, Nuremberg (DE); Olai Ihle, Eckental (DE); Klaus Weiske, Schwaig (DE)

(73) Assignee: BÜHLER MOTOR GMBH, Nürnberg (DE)

( * ) Notice: Subject to any disclaimer, the term of this patent is extended or adjusted under 35 U.S.C. 154(b) by 552 days.

(21) Appl. No.: 14/605,310

(22) Filed: Jan. 26, 2015

(65) Prior Publication Data

US 2015/0211523 A1 Jul. 30, 2015

(30) Foreign Application Priority Data

Jan. 28, 2014 (DE) .......... 10 2014 201 487

(51) Int. Cl.
*F04D 1/04* (2006.01)
*F04D 13/06* (2006.01)
(Continued)

(52) U.S. Cl.
CPC .......... *F04D 1/04* (2013.01); *F04D 13/0606* (2013.01); *F04D 13/0673* (2013.01); *F04D 17/08* (2013.01); *F04D 29/026* (2013.01); *F04D 29/22* (2013.01); *F04D 29/2227* (2013.01); *F04D 29/42* (2013.01); *F04D 29/426* (2013.01); *B29C 65/08* (2013.01); *B29C 65/48* (2013.01); *B29C 65/606* (2013.01); *B29C 65/7829* (2013.01); *B29C 66/12464* (2013.01); *B29C 66/21* (2013.01); *B29C 66/30223* (2013.01); *B29C 66/54* (2013.01); *B29C 66/71* (2013.01); *B29L 2031/08* (2013.01); *B29L 2031/7496* (2013.01); *F04D 13/026* (2013.01); *F05D 2300/43* (2013.01)

(58) Field of Classification Search
CPC . F04D 1/04; F04D 17/08; F04D 29/22; F04D 29/2222; F04D 29/2227; F04D 29/42; F04D 29/4293; F04D 29/445; F04D 29/447; F04D 29/62; F04D 29/628
See application file for complete search history.

(56) References Cited

U.S. PATENT DOCUMENTS

| 6,033,183 | A | * | 3/2000 | Genster | ............... | B29C 45/0062 |
| | | | | | | 416/183 |
| 6,685,446 | B2 | * | 2/2004 | Marioni | ............... | F04D 13/021 |
| | | | | | | 310/62 |

(Continued)

FOREIGN PATENT DOCUMENTS

WO   2011/131251 A1   10/2011

*Primary Examiner* — Ninh H. Nguyen
*Assistant Examiner* — Brian P Wolcott
(74) *Attorney, Agent, or Firm* — Westerman, Hattori, Daniels & Adrian, LLP

(57) ABSTRACT

A centrifugal pump impeller in an electromotive centrifugal pump, the impeller including a base body having a bearing to which is attached, on a first end, a permanent-magnetic rotor and, on a second end, a cover disk that is mounted on the base body; and a plurality of pump blades made of first and second parts, the first part being a base blade segment attached to the base body thus forming a first unitary piece and a cover disk blade segment attached to the cover disk thus forming a second unitary piece.

10 Claims, 5 Drawing Sheets

(51) Int. Cl.
    *F04D 17/08*     (2006.01)
    *F04D 29/02*     (2006.01)
    *F04D 29/22*     (2006.01)
    *F04D 29/42*     (2006.01)
    *B29L 31/00*     (2006.01)
    *B29C 65/08*     (2006.01)
    *B29C 65/48*     (2006.01)
    *B29C 65/60*     (2006.01)
    *B29C 65/00*     (2006.01)
    *B29L 31/08*     (2006.01)
    *F04D 13/02*     (2006.01)
    *B29C 65/78*     (2006.01)

(56) References Cited

U.S. PATENT DOCUMENTS

2011/0200439 A1*   8/2011   Nakaniwa ............ F04D 29/023
                                                               416/189
2013/0039784 A1*   2/2013   Teubel ................. F04D 29/026
                                                               417/355

* cited by examiner

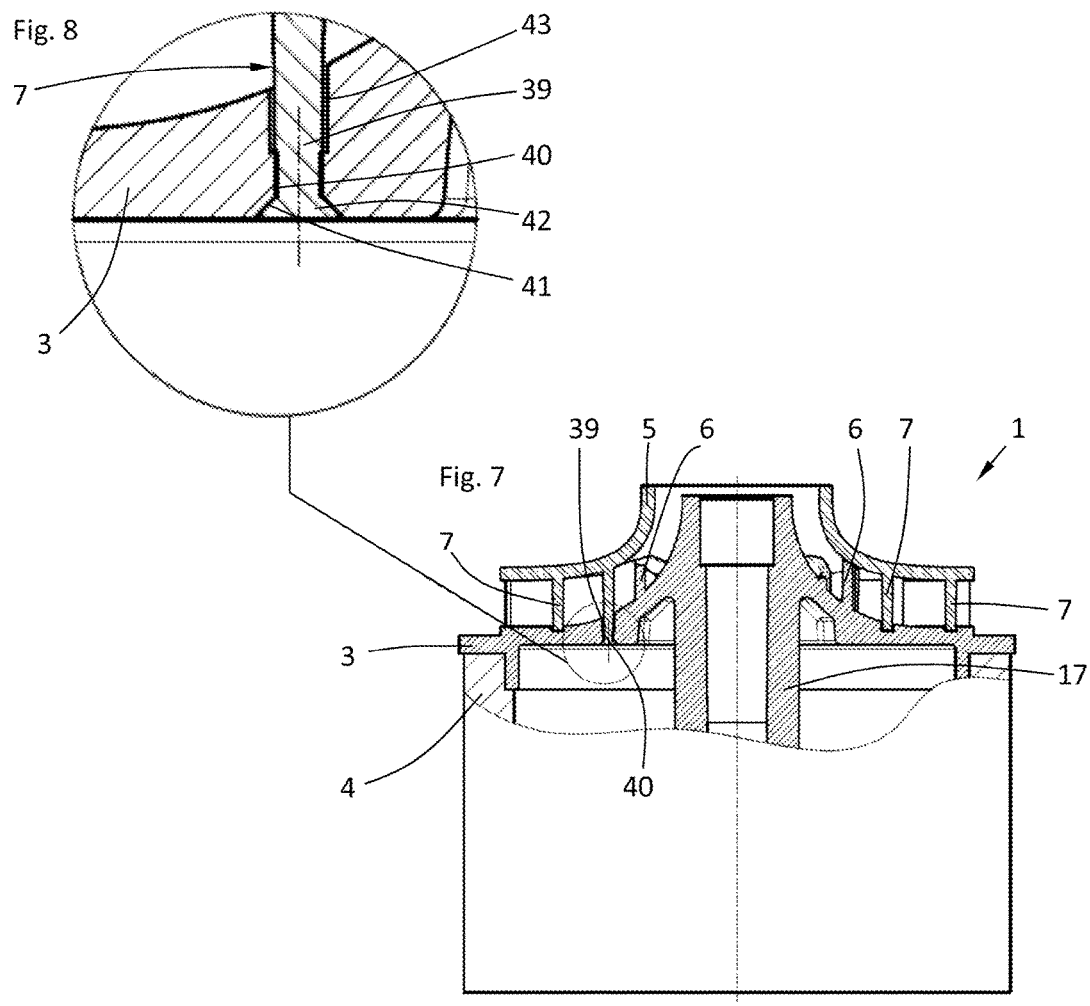

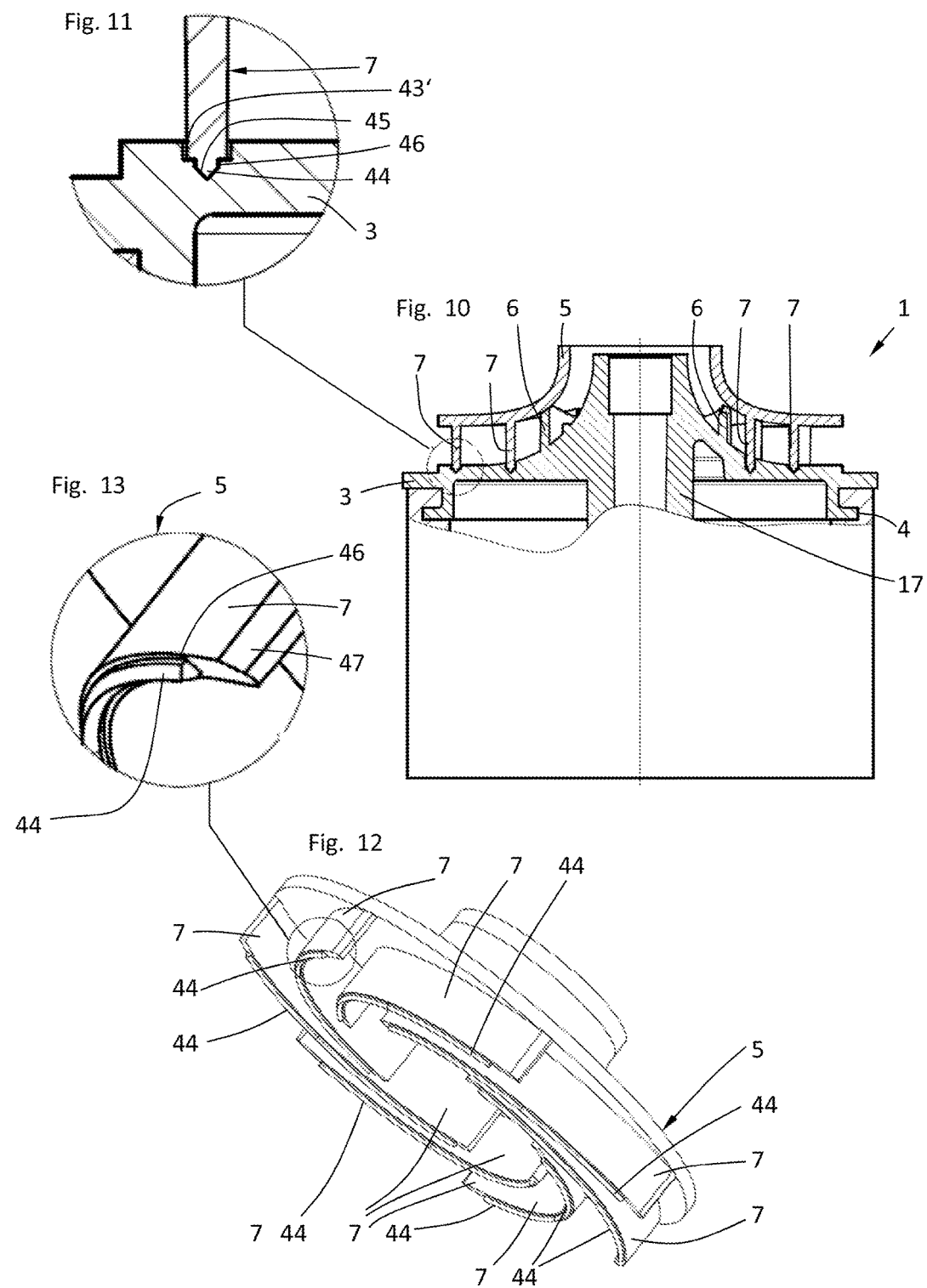

CENTRIFUGAL PUMP IMPELLER

CROSS-REFERENCE TO RELATED APPLICATIONS

The present patent application claims priority from German Application No. 102014201487.5, filed Jan. 28, 2014, which is incorporated herein by reference in its entirety.

BACKGROUND OF THE INVENTION (1) Field of the Invention

The invention relates to a centrifugal pump impeller having pump blades made of a plastic material processed by injection molding technology for an electromotive centrifugal pump consisting of a base body having a bearing to which is attached, at one end, a permanent-magnetic rotor and, at the other end, a cover disk that is mounted on the base body.

(2) Description of Related Art Including Information Disclosed Under 37 CFR 1.97 and 1.98

Centrifugal pumps are frequently used as auxiliary water pumps in motor vehicles and mostly assist belt-driven main cooling water pumps. Thanks to their superb controllability, centrifugal pumps are generally also integrated into brushless DC motors. These motors possess a wound stator and a permanent-magnetic rotor that form a compact assembly with a centrifugal pump impeller. The rotors can be configured both as internal rotors and as external rotors. The centrifugal pump impeller is located in a wet chamber, which is sealed off by a partition wall from a dry chamber that includes the stator. Centrifugal pump impellers generally consist of a permanent-magnetic area and a hydraulic area. The hydraulic area comprises a disk and pump blades attached to it that project the pumping medium radially outward, thereby generating a pump pressure. Open centrifugal pump impellers and closed ones that have a cover disk are known. Centrifugal pump impellers with cover disks are more efficient but are more difficult to manufacture. In the case of centrifugal pump impellers manufactured using injection molding technology, especially problematic is the demolding process of the relatively complicated mold. That is why the cover disks are often manufactured separately and then installed.

A generic centrifugal pump impeller with a cover disk is known from WO 2011/131251 A1. It consists of plastic material processed by injection molding technology, the base body forming one piece with the permanent-magnetic rotor and consisting throughout of a plastic-bonded magnet material. The impellers form one piece with the cover disk and consist of a plastic material without permanent-magnetic components. The separation into two parts enables the mechanical and permanent-magnetic properties of the function to be correspondingly optimized. However, since the base body also contains permanent-magnetic material, the cost of materials is higher. This is especially true when higher-quality permanent-magnetic materials are used. In the known centrifugal pump impeller, the pump blades always have a width that corresponds to the distance from the base body up to the cover disk, so that there is no gap between them. However, studies have shown that from a flow technology point of view, it is more desirable if the pump blades have a lead-in chamfer on the inside. However, in the case of the known pumps, for manufacturing technology reasons this cannot be realized or can be realized only at great expense.

Therefore, the problem solved by the present invention is to ensure that a centrifugal pump rotor of the kind mentioned at the outset has a simple design, is more efficient and can be manufactured economically.

SUMMARY OF THE INVENTION

According to the invention, this problem is solved by a plurality of pump blades made of two parts and formed, having a base blade segment that with a base body forms the first part and a cover disk blade segment that with a cover disk forms the second part. Because the pump blades are formed in two pieces, base blade segments forming one piece with the base body and cover disk blade segments forming one piece with the cover disk, there are design possibilities that allow for an optimized blade geometry and thus are more efficient, making it possible to use simple tools.

Pump impellers mostly have flow surfaces that are curved. If such parts consist of two pieces and are supposed to be mounted in such curved areas, significant problems result because such contours are difficult to calculate, especially if shrinkage problems must be taken into account. That is why one especially preferred embodiment of the invention provides that essentially all axial boundary surfaces of the cover disk blade segments adjacent to the base body lie on the same plane. When these axial boundary surfaces also serve as contact surfaces, there are defined and calculable conditions.

High mechanical strength and a precise arrangement of the junction between the cover disk and the base body can be achieved by engagement of the cover disk blade segments into grooves defined in the base body.

If such parts that fit into the grooves are welded or glued together, it is possible that excess material will accumulate in the grooves and not make it into the area of the flow contour. In that case, ultrasonic welding is the preferred welding method.

Alternatively, however, there is also the possibility that the cover disk blade segments are connected to the base body by hot stamping connecting pins that preferably extend from the cover disk blade segments through recesses provided in the base body adapted to them.

Due to the flow contour, a very deep groove is necessary in the area near the axis of rotation in order to exploit the advantages cited above. Moreover, studies have shown that lead-in chamfers significantly increase pump efficiency. For these reasons, it is advantageous if the base blade segments are arranged radially inside the cover disk blade segments to which they are attached. At the same time, the lead-in chamfers are designed so that the wingspan of the base blade segments extends through the lead-in chamfers from a minimum value radially inward up to a maximum value radially outward. At the same time, it is also provided that the maximum value of the wingspan of the base blade segments corresponds to a wingspan of the cover disk blade segments in a radial inner section attached to the base blade segments.

Due to the lead-in chamfers, between the base blade segments and the cover disk is a free space that narrows radially outward towards the cover disk blade segments.

Especially high efficiency results if the base body has a flow surface that passes continuously from a cylinder ring surface originating from a suction port to a ring surface, the flow surface being limited radially by the pump blades and always self-contained in a spiral-shaped course.

DESCRIPTION OF THE SEVERAL VIEWS OF THE DRAWINGS

One exemplary embodiment of the invention is explained in detail below by means of an example:

FIG. 7 is a cross section view of a further embodiment of the centrifugal pump impeller incorporating the present invention;

FIG. 8 is an enlarged section from FIG. 7;

FIG. 9 is a perspective view of a cover disk found in the present invention;

FIG. 10 shows a cross section of another variant of the centrifugal pump impeller incorporating the present invention;

FIG. 11 is an enlarged section from FIG. 10;

FIG. 12 is a perspective view of a variant of the cover disk in accordance with the present invention; and FIG. 13 is an enlarged section from FIG. 12.

DETAILED DESCRIPTION OF THE INVENTION

Figure 1:
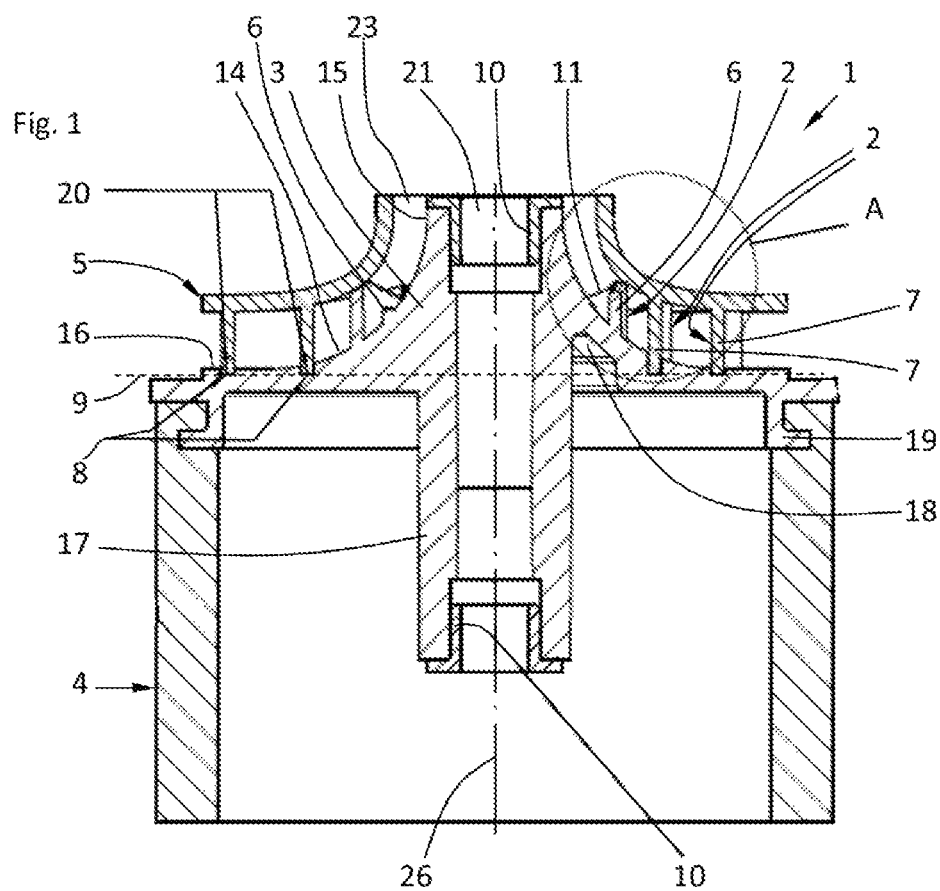
FIG. 1 is a cross section view of a centrifugal pump impeller according to the invention.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

FIG. 1 shows a cross section of a centrifugal pump impeller 1 according to the invention, having a base body 3, a permanent-magnetic rotor 4 and a cover disk 5. The base body 3 has a supporting tube 17 into which two bearings 10 are incorporated, which in this case are configured as plastic plain bearings—alternatively, a ceramic plain bearing can be used. The plastic plain bearings are press-fit into the supporting tube. The supporting tube 17 forms one piece with the base body 3. The base body 3 also has a flow surface 14 that expands out continuously from a cylinder ring surface 15 in the diameter and extends up to a ring surface 16. The flow surface 14 is limited radially by pump blades 2. A plurality of pump blades 2 are formed in two pieces, each with a base blade segment 6 that foams one piece with the base body 3 and a cover disk blade segment 7 that forms one piece with the cover disk 5.

The cover disk blade segments 7 each go into mating grooves 20 that extend out from the flow surface 14 up to a plane 9 in the material of the base body 3. Axial boundary surfaces 8 of the cover disk blade segments 7 lie on the same plane 9. The base blade segments 6 have a lead-in chamfer 11 that extends from an area near the center with a reduced wingspan W1 to the cover disk blade segments 7 with a maximum wingspan W2. To prevent accumulations of material, a recess 18 is molded in on the side of the base body 3 opposite the base blade segments 6. The permanent-magnetic rotor 4 consists in this case of a plastic-bonded magnetic body that is primary molded around an area 19 of the base body 3 that in cross section is L-shaped. This results in a form fit that has additional torsion protection (not shown here) in the form of recesses or protrusions. Also shown in FIG. 1 is an annular suction opening 23, a bearing recess 21 and a pivot 26.

Figure 2:
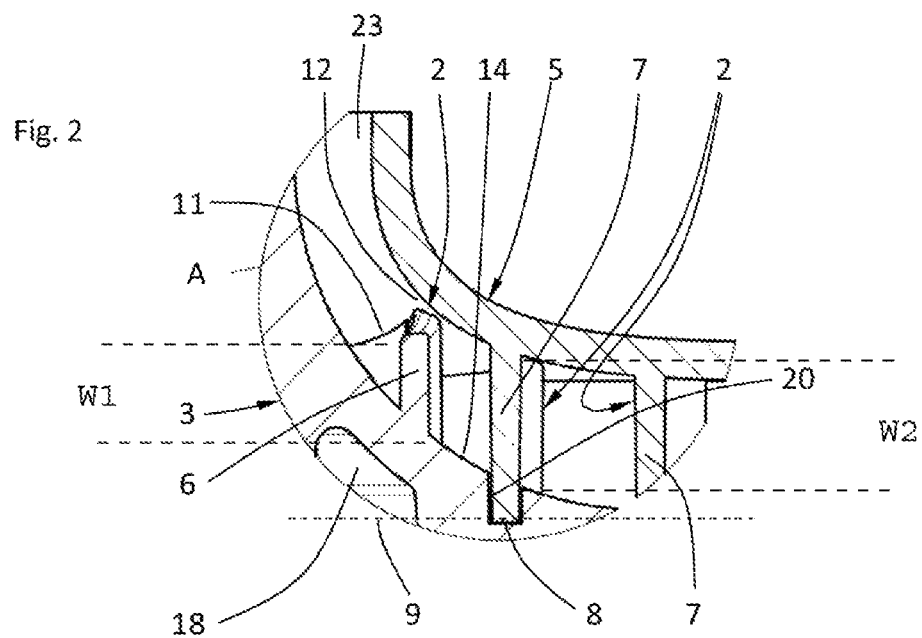
FIG. 2 is an enlarged section A from FIG. 1.

FIG. 2 shows an enlarged section A from FIG. 1, with the base body 3, the pump blades 2, the cover disk 5, the base blade segment 6, the cover disk blade segments 7, the groove 20, the boundary surface 8, the plane 9, the suction opening 23 and the lead-in chamfer 11, which as a result has a recess 12 between the cover disk 5 and the base blade segment 6.

Figure 3:
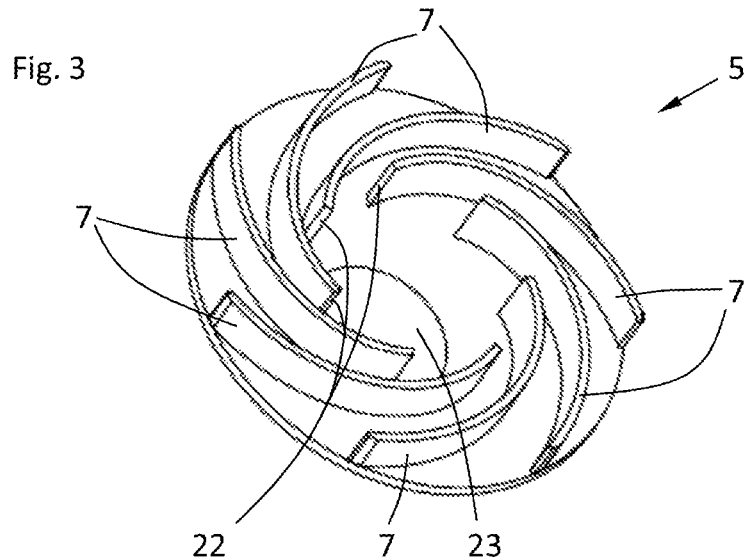
FIG. 3 is a perspective view a cover disk of the centrifugal pump impeller.
Figure 6:
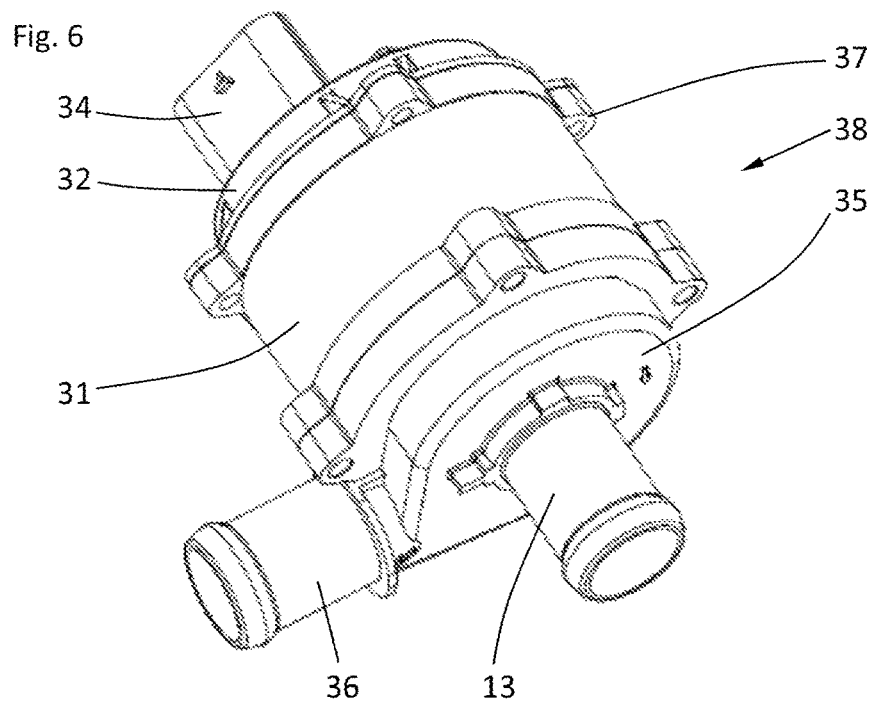
FIG. 6 is a perspective view of the inventive centrifugal pump.

FIG. 3 shows the cover disk 5 of the centrifugal pump impeller as an individual part with the cover disk blade segments 7 and the suction opening 23 that corresponds to a suction port 13 (see FIG. 6). The cover disk blade segments 7 have on their radial inner ends limits 22 that correspond to contact surfaces 24 (see FIG. 4) of the base body 3.

Figure 4:
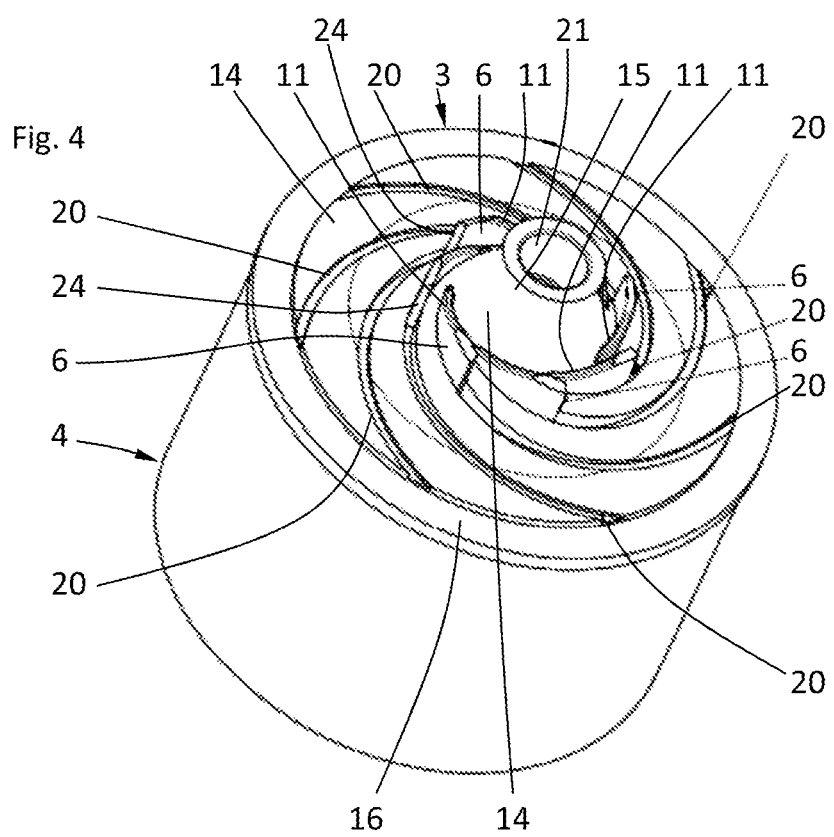
FIG. 4 is a perspective view of a base body of the centrifugal pump impeller.

FIG. 4 shows the cylindrically shaped base body 3 of the centrifugal pump impeller, having the cylindrically shaped permanent-magnetic rotor 4, the spiral grooves 20, the base blade segments 6, the lead-in chamfers 11, the contact surfaces 24, the bearing recess 21 and the contact surface 24, along with the cylinder ring surface 15 and the ring surface 16. The groove depth of the grooves 20 increases in the direction of the base blade segments 6.

Figure 5:
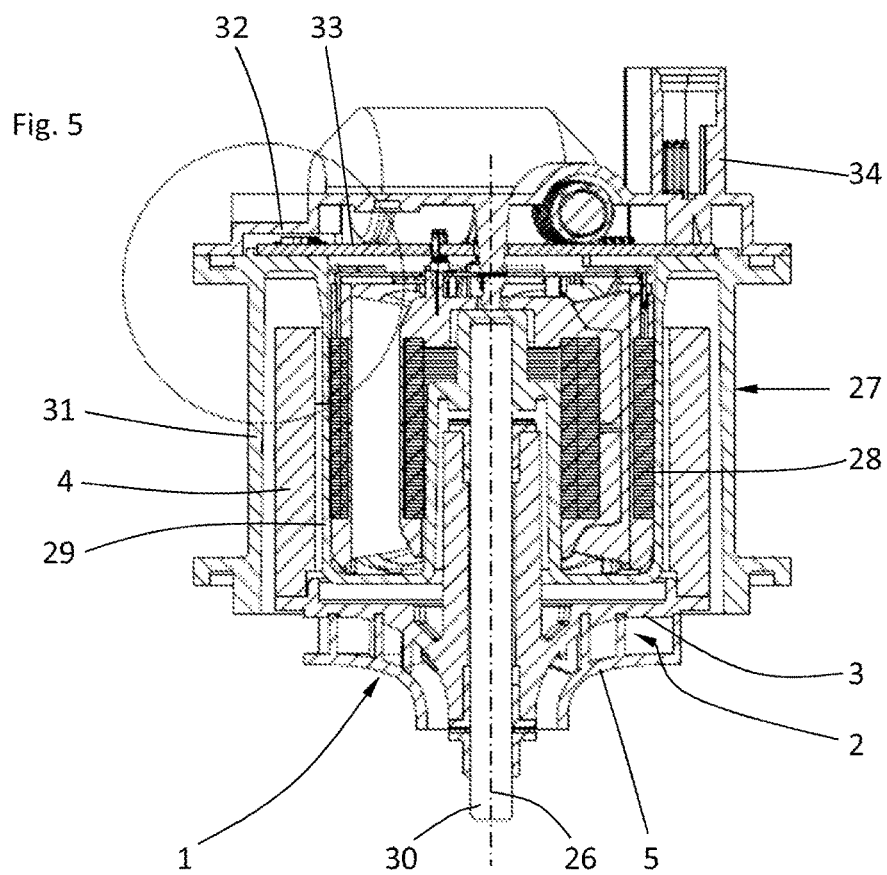
FIG. 5 is a cross section view of a centrifugal pump motor incorporating the present invention.

FIG. 5 shows a cross section of a centrifugal pump motor 27, having the centrifugal pump impeller 1, with the permanent-magnetic rotor 4, the base body 3, the cover disk 5 and the pump blades 2, a shaft 30, a partition wall 29 that forms one piece with a motor casing 31, a casing cover 32 that is provided with a connector plug 34 and a circuit board 33. A face-side pump casing 35 is shown in FIG. 6.

FIG. 6 is a three-dimensional view of a centrifugal pump 38, having a pump casing 35, a suction port 13, the motor casing 31, the casing cover 32, the connector plug 34 and a plurality of screw-on eyes 37. The screw-on eyes also help attach casing cover 32 and pump casing 35 to the motor casing 31.

FIG. 7 shows a cross section of a second embodiment of the centrifugal pump impeller 1, having the base body 3, the cover disk 5, the base blade segments 6, the cover disk blade segments 7, the permanent-magnetic rotor 4 and the supporting tube 17. The variant is characterized by connecting pins 39, which extend axially from the cover disk blade segments 7 through connecting recesses 40.

FIG. 8 shows an enlarged section from FIG. 7, making it easier to see the connecting pin 39 that extends from the cover disk blade segment 7 and the connection recess 40. The drawing shows an end section 42 of the connecting pin 39 compressed by hot shaping into a conical extension 41. To that end, the connecting pin is dimensioned so that it protrudes from the connecting recess 40 prior to reshaping. The protruding material is then forced into the conical extensions 41 as it is subjected to heat. A slightly enlarged in diameter inserter 43 at the start of the connecting recess 40 makes it easier to join the cover disk 5 to the base body 3, in particular the connecting pin 39 to the connecting recesses 40.

FIG. 9 is a three-dimensional drawing of a cover disk 5, having the connecting pins 39 that extend axially from the cover disk blade segments 7. In this case, each cover disk blade segment 7 supports two connecting pins 39. The number of connecting pins 39 depends on the size of the cover disk and the mechanical requirements.

FIG. 10 shows a cross section of a third embodiment of the centrifugal pump impeller 1, having the base body 3, the cover disk 5, the base blade segments 6, the cover disk blade segments 7, the permanent-magnetic rotor 4 and the supporting tube 17. The third embodiment is characterized by V-shaped ribs 44 acting as energy directors that extend from the cover disk blade segments 7 axially into corresponding non-continuous grooves 45 (see FIG. 11). This type of connection is chosen if an ultrasonic welded joint is used. The V-shaped ribs 44 (see FIG. 11) help concentrate the oscillation energy, so that the material of the ribs 44 is fused at the neck and bonds to the surrounding material of the base body 3.

FIG. 11 shows an enlarged section from FIG. 10. Visible in it is one of the cover disk blade segments 7 having a narrow rectangular base rib 46 attached to the cover disk blade segment 7 and the V-shaped rib 44 attached in turn to it. The rib extends into the groove 45.

FIG. 12 is a three-dimensional drawing of a fourth embodiment of the cover disk 5, having the cover disk blade segments 7 and the ribs 44.

In FIG. 13, which shows an enlarged section from FIG. 12, the geometry of the ribs 44 is more clearly visible. Next to the V-shaped rib 44 is the rib base 46 and a slope 47 which are provided with radial blade ends on the outside.

In all configurations, the cover disk 5, the base body 3 and the partition wall are made of a PPS material (polyphenylene sulfide), in particular PPS-GF40. The basic material of the plastic-bonded permanent magnets is also made of PPS. Ferrite serves as the magmet material. The casing cover 32 and the pump casing 35 are made of PPA-GF40 (polyphthalamide).

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

LIST OF REFERENCE NUMERALS:

| | |
|---|---|
| 1 | Centrifugal pump impeller |
| 2 | Pump blades |
| 3 | Base body |
| 4 | Permanent-magnetic rotor |
| 5 | Cover disk |
| 6 | Base blade segment |
| 7 | Cover disk blade segment |
| 8 | Boundary surface |
| 9 | Common plane |
| 10 | Bearing |
| 11 | Lead-in chamfer |
| 12 | Free space |
| 13 | Suction port |
| 14 | Flow surface |
| 15 | Cylinder ring surface |
| 16 | Ring surface |
| 17 | Supporting tube |
| 18 | Recess |
| 19 | L-shaped area |
| 20 | Groove |
| 21 | Bearing recess |
| 22 | Limit |
| 23 | Suction opening |
| 24 | Contact surface |
| 26 | Pivot |
| 27 | Centrifugal pump motor |
| 28 | Stator |
| 29 | Partition wall |
| 30 | Shaft |
| 31 | Motor casing |
| 32 | Casing cover |
| 33 | Circuit board |
| 34 | Connector plug |
| 35 | Pump casing |
| 36 | Pressure ports |
| 37 | Screw-on eyes |
| 38 | Centrifugal pump |
| 39 | Connecting pins |
| 40 | Connecting passageways |
| 41 | Conical extension |
| 42 | End section |
| 43 | Inserter |
| 44 | Rib |
| 45 | Groove |
| 46 | Base rib |
| 47 | Slope |

What is claimed is:

1. A closed centrifugal pump impeller in an electromotive centrifugal pump that includes a permanent-magnetic rotor, the closed centrifugal pump impeller comprising:
a base body having a bearing, the base body being fit to the permanent-magnetic rotor;
a cover disk being mounted on the base body, the cover disk having a suction opening surrounding the bearing;
a plurality of pump blades, each pump blade of the plurality of pump blades made of a first part and a second part, each first part being a base blade segment attached to the base body thus forming a first unitary piece and the second part being a cover disk blade segment attached to the cover disk thus forming a second unitary piece, the plurality of pump blades being positioned between the cover disk and the base body when the cover disk is mounted on the base body; and
an axial boundary surface formed on each of the cover disk blade segments, and wherein each axial boundary surface lies flat against the base body on the same plane.

2. The closed centrifugal pump impeller according to claim 1, further comprising grooves formed in the base body, wherein each cover disk blade segments are inserted in the grooves.

3. The closed centrifugal pump impeller according to claim 1, wherein each cover disk blade segments is connected to the base body by an ultrasonic weld.

4. The closed centrifugal pump impeller according to claim 1, wherein each cover disk blade segment is connected to the base body by an adhesive bond.

5. The closed centrifugal pump impeller according to claim 1, further comprising connecting pins extending from each cover disk blade segment, and connecting passageways formed in the base body, wherein each cover disk blade segment is connected to the base body by a hot stamp of the connecting pins through the connecting passageways.

6. A closed centrifugal pump impeller in an electromotive centrifugal pump that includes a permanent-magnetic rotor, the closed centrifugal pump impeller comprising:
a base body having a bearing, the base body being fit to the permanent-magnetic rotor;
a cover disk being mounted on the base body, the cover disk having a suction opening surrounding the bearing;

a plurality of pump blades, each pump blade of the plurality of pump blades made of a first part and a second part, each first part being a base blade segment attached to the base body thus forming a first unitary piece and the second part being a cover disk blade segment attached to the cover disk thus forming a second unitary piece, the plurality pump blades being positioned between the cover disk and the base body when the cover disk is mounted on the base body;

an axial boundary surface formed on each of the cover disk blade segments, and wherein each axial boundary surface lies flat against the base body on the same plane, and wherein each base blade segment is arranged radially within one cover disk blade segment, each of the base blade segments being attached to one of the cover disk blade segments.

7. The closed centrifugal pump impeller according to claim 6, further comprising lead-in chamfers defined on each of the base blade segments.

8. The closed centrifugal pump impeller according to claim 7, wherein the base blade segments each have a length and wherein the length of each base blade segment extends through the lead-in chamfers from a minimum value radially inward up to a maximum value radially outward.

9. The closed centrifugal pump impeller according to claim 8, wherein the maximum value of the length of the base blade segment corresponds to a length of each cover disk blade segment in a radial inner section, each radial inner section attached to its corresponding base blade segment.

10. The closed centrifugal pump impeller according to claim 6, wherein between each base blade segment and each cover disk is a free space that narrows radially outward toward each of the cover disk blade segments.

* * * * *